United States Patent
Bardon

(10) Patent No.: US 11,378,145 B2
(45) Date of Patent: Jul. 5, 2022

(54) STEPPED TORQUE BRAKING DEVICE

(71) Applicant: Warner Electric Euorpe S.A.S., Saint Barthélémy d'Anjou (FR)

(72) Inventor: Arnaud Bardon, Tiercé (FR)

(73) Assignee: Warner Electric Europe S.A.S., Saint Barthélémy d' Anjou (FR)

( * ) Notice: Subject to any disclaimer, the term of this patent is extended or adjusted under 35 U.S.C. 154(b) by 115 days.

(21) Appl. No.: 16/755,918

(22) PCT Filed: Oct. 25, 2017

(86) PCT No.: PCT/FR2017/052942
§ 371 (c)(1),
(2) Date: Apr. 14, 2020

(87) PCT Pub. No.: WO2019/081820
PCT Pub. Date: May 2, 2019

(65) Prior Publication Data
US 2020/0300313 A1    Sep. 24, 2020

(51) Int. Cl.
*F16D 55/28* (2006.01)
*F16D 59/02* (2006.01)
(Continued)

(52) U.S. Cl.
CPC ............ *F16D 55/28* (2013.01); *F16D 59/02* (2013.01); *F16D 55/02* (2013.01);
(Continued)

(58) Field of Classification Search
CPC .. F16F 55/36; F16F 55/38; F16F 59/02; F16F 2121/22; F16D 55/36; F16D 55/38; F16D 59/02; F16D 2121/22; F16D 2055/0066
(Continued)

(56) References Cited

U.S. PATENT DOCUMENTS 2,218,616 A * 10/1940 McCune .................. B61H 5/00
                                                          188/153 R
3,763,968 A * 10/1973 Noly ....................... F16D 55/02
                                                         188/171
(Continued)

FOREIGN PATENT DOCUMENTS

CN        1162079 A      10/1997
CN        1715699 A      1/2006
(Continued)

OTHER PUBLICATIONS

Office Action issued in corresponding Chinese Patent Application No. 201780096246.5 (dated Mar. 30, 2021).
(Continued)

*Primary Examiner* — Thomas J Williams
(74) *Attorney, Agent, or Firm* — Reising Ethington P.C.

(57) ABSTRACT

A braking device of at least one rotary shaft (S) extending along an axis X includes an actuation unit (I) comprising at least one winding (B), two friction discs (D1, D2), an end flange (F1), an intermediate flange mounted between the two friction discs (D1, D2), and two magnetic armatures (A1, A2) biased by two series of springs (R1, R2). The magnetic armatures (A1, A2) are arranged in series along the longitudinal axis X, with each of the series of springs (R1, R2) respectively biasing a magnetic armature (A1, A2). A series of springs (R2) passes through the thickness of one of the two magnetic armatures (A1) in order to bias the other magnetic armature (A2).

16 Claims, 5 Drawing Sheets

(51) Int. Cl.
*F16D 55/02* (2006.01)
*F16D 55/00* (2006.01)
*F16D 121/22* (2012.01)
*F16D 127/04* (2012.01)

(52) U.S. Cl.
CPC .. *F16D 2055/0066* (2013.01); *F16D 2121/22* (2013.01); *F16D 2127/04* (2013.01)

(58) Field of Classification Search
USPC .................................................. 188/171, 173
See application file for complete search history.

(56) References Cited

U.S. PATENT DOCUMENTS

| | | | |
|---|---|---|---|
| 4,445,596 A | | 5/1984 | Mustico, Jr. et al. |
| 5,057,728 A | * | 10/1991 | Dammeyer ............. F16D 65/46 310/77 |
| 5,199,532 A | * | 4/1993 | Suganuma ............ B60T 13/748 187/359 |
| 6,211,590 B1 | * | 4/2001 | Albrecht ................. F16D 55/28 188/158 |
| 6,237,730 B1 | | 5/2001 | Dropmann et al. |
| 6,471,017 B1 | * | 10/2002 | Booz ....................... F16D 65/18 188/72.7 |

FOREIGN PATENT DOCUMENTS

| | | |
|---|---|---|
| CN | 101468643 A | 7/2009 |
| CN | 102449274 A | 5/2012 |
| DE | 41 09 740 A1 | 10/1992 |
| DE | 10 2012 019 136 A1 | 4/2014 |
| DE | 10 2016 201 271 A1 | 8/2017 |
| JP | H10-306834 A | 11/1998 |
| JP | 2010014156 A | 1/2010 |
| WO | 1992/016768 A1 | 10/1992 |
| WO | WO-2010001827 A1 * | 1/2010 ............ F16D 27/112 |

OTHER PUBLICATIONS

English Translation of Office Action issued in corresponding Chinese Patent Application No. 201780096246.5 (dated Mar. 30, 2021).
International Search Report issued in International (PCT) Application No. PCT/FR2017/052942 (dated Aug. 9, 2018).
English Translation of International Search Report issued in International (PCT) Application No. PCT/FR2017/052942 (dated Aug. 9, 2018).
Written Opinion issued in International (PCT) Application No. PCT/FR2017/052942 (dated Aug. 9, 2018).
International Preliminary Examination Report issued in International (PCT) Application No. PCT/FR2017/052942 (dated Sep. 16, 2019).
English (machine) translation of DE 41 09 740 A1.
English (machine) translation of DE 10 2012 019 136 A1.
English (machine) translation of DE 10 2016 201 271 A1.

* cited by examiner

STEPPED TORQUE BRAKING DEVICE

CROSS-REFERENCE TO RELATED APPLICATIONS

This application is the national stage application of International Application No. PCT/FR2017/052942, flied Oct. 25, 2017, which designates the United States of America. The International Application is incorporated herein by reference in its entirety.

BACKGROUND OF THE INVENTION

The present invention concerns a braking device for braking and locking a single shaft or two independent rotary shafts arranged along a longitudinal axis. The braking device comprises at least an actuation unit comprising at least one winding and two series of springs mounted in a fixed housing, two friction discs mounted axially slidable on the single shaft or on the two rotary shafts, respectively, a rotationally fixed end flange, an intermediate flange that is rotationally fixed but mounted axially slidable between the two friction discs, and two magnetic armatures that are rotationally fixed, but mounted axially slidable and biased respectively, when idle, by the two series of springs, in such a way that one of the two magnetic armatures is pushed against one of the two friction discs that then engages the intermediate flange, which in turn engages the other friction disc, which engages the end flange, and when the winding is supplied with current the magnetic armatures are magnetically biased towards the winding, thus releasing the two friction discs and the intermediate flange.

Such braking devices are used particularly in electric industrial transport vehicles or hoisting systems, and more generally in any type of device comprising a rotary shaft, or even two independent rotary shafts arranged along one longitudinal axis, in order to generate a stepped, progressive or cushioned braking in the event of an emergency stop with one braking force gradient per step. The purpose is to avoid any abrupt braking that could result in a loss of the load or material damage.

Known in the prior art is document U.S. Pat. No. 6,211,590B1, which describes this type of braking device for a forklift, wherein the two magnetic armatures are arranged in series along the longitudinal axis X with two series of springs respectively biasing each magnetic armature. A single winding makes it possible to control the displacement of the armatures. Such a device allows a braking force that is stepped but limited due to a significant space requirement, and it requires current means of control that are complex and precise. This braking device cannot tolerate dimensional variations of the components.

A purpose of the present invention is to improve this type of device by very significantly increasing its braking force, while preventing the premature wear currently found with various discs. Moreover, the present invention seeks to simplify the electrical control means of the braking device while tolerating greater dimensional variations for the components.

Also known in the prior art is document DE102016201271A1, which describes a braking device of this type for forklifts, wherein the two magnetic armatures are arranged concentrically in parallel. The series of springs are also arranged in parallel. In order to transmit the thrust forces of the springs from the concentric magnetic armatures to the first friction disc, a force transmission element is provided in the form of a disc, which is inserted between the two concentric magnetic armatures and the first friction disc. This force transmission element is not biased directly by the springs, but by one or the other of the two concentric magnetic armatures. Of course, such a braking device requires the implementation of two concentric windings received in different receptacles of the shell of the inductor. The concentric arrangement of the armatures and windings results in considerably increasing the total space required for the braking device, making it difficult to accommodate it in some motor housings.

A purpose of the present invention is to improve this type of braking device by reducing its size, particularly in the radial (diameter) direction, while providing a stepped or progressive braking. Moreover, the present invention seeks to simplify the design of these braking devices in order to facilitate their assembly in motor housings.

SUMMARY

To that end, the present invention proposes that the magnetic armatures be arranged in series along the longitudinal axis X, with each of the series of springs respectively biasing a magnetic armature, a series of springs passing through the axial thickness of one of the two magnetic armatures in order to bias the other magnetic armature. It can therefore be said that the different elements of the braking device are stacked one after the other along the axis X in the following order: inductor, first magnetic armature, second magnetic armature, first friction disc, intermediate flange, second friction disc, and finally end flange, a single shaft or two independent shafts passing completely or partly through all of them.

By associating two or more friction discs in series with two magnetic armatures in series, the braking force of the device is multiplied while preserving an identical radial space requirement. This configuration also ensures perfect alignment of the thrust forces on the friction surfaces of the braking device (the average thrust radius can remain identical, while with concentric armatures the thrust radius is interior or exterior), while increasing the progressivity and efficiency of braking.

According to one interesting characteristic of the invention, the intermediate flange can be elastically biased towards the friction disc adjacent to one of the two magnetic armatures, in such a way that when idle, it separates from the friction disc adjacent to the end flange. Advantageously, the intermediate flange engages a fixed stop under the action of the elastic biasing, so as to be separated when idle from both friction discs at the same time. This ensures that the friction discs are not in contact with the intermediate flange, in the absence of braking, which could generate premature wear of the friction discs, hinder the operation of the motor that drives the shaft or create problems such as undesirable noises or increased temperature of the braking device.

According to one practical embodiment, the braking device comprises assembly screws that connect the end flange to the actuation unit, at least some of said assembly screws being provided with guide sleeves that together form the fixed stop for the intermediate flange, which is biased, advantageously by a spring mounted around a section of the guide sleeve and which is supported on the end flange. It should be noted that the displacement and the stop of the intermediate flange are achieved by means of a single additional part, since the guide sleeve is an element the primary function of which is to ensure the integrity of the braking device by bearing the pressure and torsion stresses. The intermediate flange, and advantageously also the two magnetic armatures, can also be locked in rotation by the guide sleeves while sliding along said sleeves. Thus, said guide sleeves fulfill a plurality of essential functions for the proper operation of the braking device.

According to one embodiment, the actuation unit comprises a single winding, the braking device comprising current/voltage control means capable of controlling the maximum and intermediate values of current/voltage supplied to the winding.

As a variant, the actuation unit comprises two different windings, advantageously arranged in a single annular receptacle formed by the housing of the actuation unit, the braking device comprising electric switching means for the two windings capable of delivering to each of the two windings only a zero voltage or a maximum voltage.

According to one embodiment, the two windings can have different powers, in such a way as to define a strong winding and a weak winding. Advantageously, the power ratio in ampere-turns of the strong winding/weak winding ranges from 1 to 4, advantageously from 1 to 3, more advantageously from 2 to 3 and preferably is equal to 2.2±0.2.

Advantageously, the two windings are arranged in series along the longitudinal axis X or concentrically in parallel.

According to another advantageous aspect of the invention, a non-magnetic intermediate air gap separates the two magnetic armatures and/or one of the two magnetic armatures from the actuation unit. This air gap can be formed by an insert, such as a strip, an applied layer such as a coating, or also be formed by one (or both) of the armatures and/or the housing, for example under form of one or more recesses filled with air. The purpose of said air gap(s) is to create a non-magnetic space in order to avoid peaks of magnetic attraction that are resistant to separation.

According to another advantageous characteristic of the invention, the magnetic armatures have different axial thicknesses, the magnetic armature adjacent to one of the friction discs advantageously having a greater thickness than the one adjacent to the actuation unit, advantageously with a ratio ranging from 1 to 3, advantageously from 1.5 to 2.2, and preferably is equal to 1.8±0.2. When the braking device is electrically energized, the reduced thickness of the magnetic armature closest to the inductor makes it possible, when it comes into contact with the inductor, to facilitate the return of the armature furthest away. Indeed, the small thickness limits the short-circuit of the electromagnet.

It will also be noted that the two magnetic armatures, the intermediate flange and the end flange are in the form of flat plates (for example circular, elliptical or polygonal) having constant thicknesses, central passages and cylindrical edges with notches. The design of these elements is therefore very simple, which facilitates their assembly and installation on site.

The braking device can be used on a single rotary shaft with the two friction discs mounted on the single shaft. As a variant, the two friction discs can be mounted respectively on two independent rotary shafts, as is the case in document DE102016201271A1.

The intent of the invention is to stagger the braking force applied to one or two rotary shafts by arranging the magnetic armatures, and optionally the windings, in series along the longitudinal axis, and not in parallel, as in document DE102016201271A1, in order to reduce the size or space requirement of the braking device, to align the axial forces exerted on the magnetic armatures and thus to optimize the forces transmitted to the two friction discs.

DESCRIPTION OF THE FIGURES

The invention will now be described in more detail with reference to the appended drawings, providing one embodiment of the invention and a variant, by way of non-limiting example.

In the Figures.

DETAILED DESCRIPTION

Figure 1:
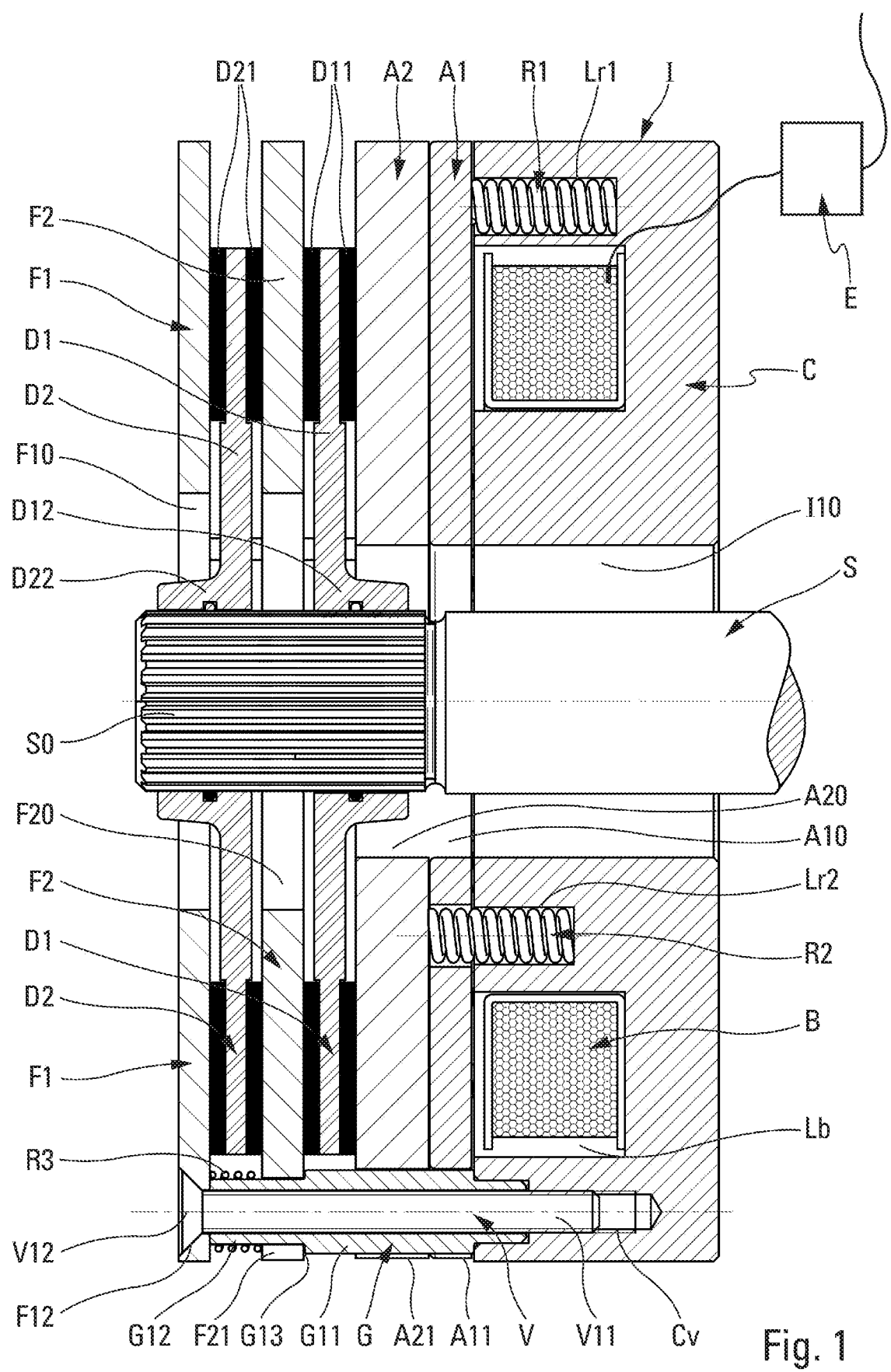
FIG. 1 is a vertical transverse cross-sectional view through a braking device for a rotary shaft according to a first embodiment of the invention.
Figure 2:
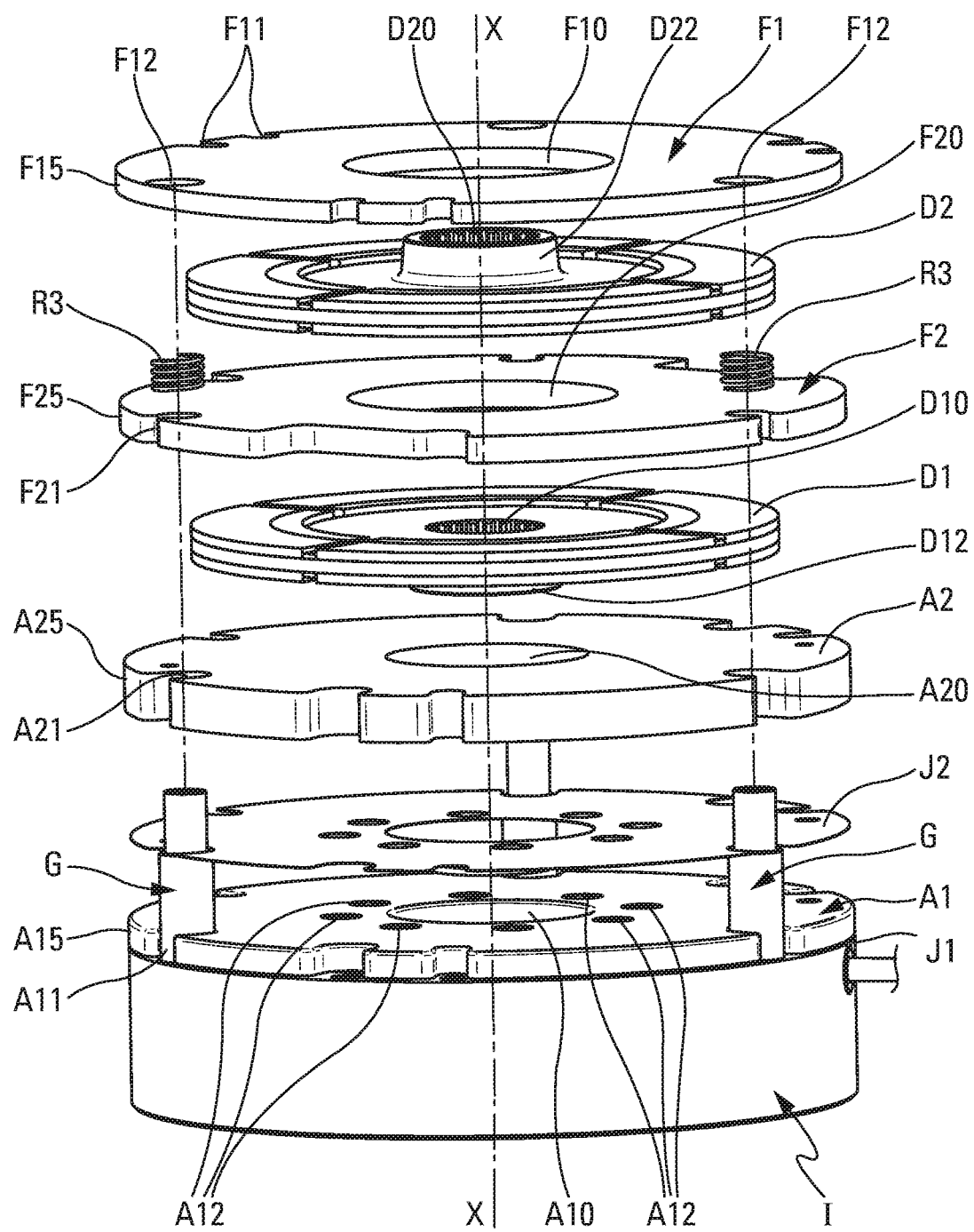
FIG. 2 is an exploded view in perspective of the braking device of FIG. 1.

Reference is made first to FIGS. 1 and 2 for a detailed explanation of the structure and operation of the electromagnetic braking device for a rotary shaft of the invention.

The electromagnetic braking device of the invention, in the first embodiment of FIGS. 1 and 2, is mounted on a single rotary shaft S, which comprises a splined shaft end S0. This shaft S can for example be driven in rotation by an electric motor. The electromagnetic braking device of the invention comprises first of all an actuation unit or inductor I which comprises a housing C that is annular (cylinder) or rectangular (parallelepiped) defining an axial central passage 110 and at least one annular (or elliptical) receptacle Lb, wherein at least one winding (or inductor winding) B of conductive wire is received. This housing C, which is sometimes designated by the term "shell," also comprises several blind bores Lr1, Lr2 each of which receives a compression spring R1, R2. These springs R1, R2 are advantageously mounted by being prestressed and can be conventional coil springs or disc springs or any other mechanical thrust system. The housing C is further provided with threaded blind bores Cv capable of receiving assembly screws V, as will be seen hereinafter.

The braking device also comprises two movable pressure plates that are generally referred to as magnetic armatures A1, A2 because they are produced from a magnetic material such as steel. Said magnetic armatures A1, A2 are fixed in rotation relative to the axis X, but movable in translation along said axis X over a limited path. The braking device also comprises two friction discs D1, D2, an end flange F1 and an intermediate flange F2. Optionally, the braking device can comprise one or two nonmagnetic intermediate layers J1, J2 arranged between the housing C and the magnetic armature A1 and/or between the two magnetic armatures A1, A2.

More precisely, the housing C comprises a first series of blind bores Lr1 and a second series of blind bores Lr2, which are distributed regularly and homogeneously around the axis X. The depth of the bores of one series can be identical to or different from the other. The springs R1 are housed in the blind bores Lr1 and the springs R2 are housed in the blind bores Lr2. The springs R1 and R2 can be identical or different, particularly with respect to their stiffness, lengths, diameters, states of compression.

The magnetic armatures A1, A2 are in the form of flat plates of constant thickness that are pierced by axial central passages A10, A20 and have cylindrical peripheral edges A15, A25 with various notches, including guide notches A11 and A21. However, the magnetic armature A2 has an axial thickness that is greater than that of the magnetic armature A1. Advantageously, the ratio between the axial thicknesses of A2/A1 is on the order of 1.5 to 2.2, and preferably said ratio is on the order of 1.8 plus or minus 20%.

The magnetic armature A1 is further pierced by a plurality of through-bores A12 for the passage of the springs R2. Thus, the springs R1 press against the magnetic armature A1 and the springs R2 press against the magnetic armature A2 by passing through the magnetic armature A1.

The braking device advantageously comprises one or two air gaps J1 and/or J2 that are inserted between the two magnetic armatures A1, A2 and/or between the magnetic armature A1 and the housing C. The function of said air gaps J1, J2 is to create a non-magnetic space in order to avoid magnetic force peaks between the movable magnetic elements, which increases or guarantees the mobility of the magnetic elements. The use of permanent air gap between the two armatures makes it possible to have a relatively large difference of release tensions of the armatures, which enables better tension controllability. Said air gaps J1 and/or J2 can be formed by an insert, such as a strip of plastic material, a ring-shaped spacer, an applied layer such as a coating brushed or sprayed on, or also formed by one (or both) of the armatures and/or the housing, for example in the form of one or more recesses filled with air, which can be obtained by machining or addition of material. The thickness of the air gap J1, J2 can be on the order of 0.02 to 0.5 mm, advantageously from 0.1 to 0.3 mm and preferably is equal to 0.2±0.05 mm.

The friction discs D1, D2 can be identical, and each comprise a splined hub D12, D22 defining an axial central passage D10, D20 which [is] slidably engaged with the end of splined shaft S0 of the single shaft S. Thus, the friction discs D1, D2 turn with the shaft S, but can slide axially on the splined end S0 thereof. The friction discs D1, D2 have a conventional configuration with friction linings D11, D21 on both faces.

The intermediate flange F2 is also in the form of a flat plate of constant thickness pierced with an axial central passage F20 and having a cylindrical peripheral edge F25 with various notches, including guide notches F21. The intermediate flange F2 is arranged between the two friction discs D1, D2 and thus serves a function as friction plate fixed in rotation, but movable in axial translation along the axis X. The intermediate flange F2 can for example be produced from a metal that is non-magnetic, a-magnetic or magnetic.

Finally, the end flange F1 is also in the form of a flat plate of constant thickness pierced with an axial central passage F10 and having a cylindrical peripheral edge F15 with various notches F11 and through-holes F12 for assembly screws V. More precisely, these through-holes F12 can be machined so as to be able to receive the heads V12 of the assembly screws V. The end flange F1 forms the outer shell of the braking device, opposite the housing C. In other words, the magnetic armatures A1, A2, the friction discs D1, D2 and the intermediate flange F2 are arranged between the housing C and the end flange F1 with the magnetic armatures A1, A2 and the intermediate flange F2 locked in rotation, but movable in axial translation and the friction discs D1, D2 movable both in rotation and in axial translation. The end flange F1 comes into contact with the friction disc D2 and thus fulfills the function of friction plate fixed in rotation as well as in axial translation along the axis X.

For the assembly of the different constituent elements of the braking device, as mentioned above, a plurality of assembly screws V, here three in number (non-limiting example), is provided, which connect the end flange F1 to the housing C of the inductor I. In more detail, the threaded pin V11 of the assembly screw V is screwed into the threaded blind bore Cv of the housing C and the head V12 is received in the through-hole F12 of the end flange F1. The pin V11 is enclosed by a guide sleeve G that can be made of steel. This sleeve G comprises a principal section G11 of larger diameter and a secondary section G12 of smaller diameter that are connected together by forming an annular shoulder G13. The principal section G11 is received in the notches A11 and A21 of the two magnetic armatures A1 and A2 so as to lock them in rotation while allowing their axial translational displacement. The secondary section G12 is received in the notch F21 of the intermediate flange F2 so as to lock it in rotation while allowing the axial translational displacement thereof. It can also be noted that a spring R3 is engaged around the secondary section G12 between the two flanges F1 and F2. This spring R3 thus continuously biases the intermediate flange F2 towards the housing C or towards the friction disc D1 until being pressed against the three annular shoulders G13, which thus together form an abutment for the intermediate flange F2. This stopped position is only reached when the magnetic armatures A1 and A2 are magnetically attracted by the winding B being supplied with current. The intermediate flange F2 is then released from the friction disc D2, as well as from the friction disc D1, since it is no longer pushed by the armature A2. Furthermore, because the braking device is often arranged in a transverse position in the vehicle, the intermediate abutted position of the intermediate flange prevents the residual torque due to the pressure of the flange on one or the other friction disc due to the action of centrifugal force, particularly when the vehicle is cornering. This characteristic is particularly beneficial in preventing the rapid premature wear of the friction linings, which is common with multiple-disc systems.

It should be noted that the use of the sleeve G to move and lock the intermediate flange F2 is a characteristic that can be implemented without the characteristics related to the two magnetic armatures. In other words, the sleeve G with the shoulder G13 and spring R3 thereof could be protected separately, so as to be able to be applied to all the braking devices having an intermediate flange arranged between two friction discs.

The braking device, in this embodiment, is further provided with means of control of current and/or voltage E for supplying the winding B. These control means E are primarily electronic and can be composed of a modular controller. The purpose of these control means E is to control the current and/or voltage supplied to the winding in order to compensate for the thermal drift (increase in temperature of the winding, which causes a loss of power) and to establish an intermediate intensity capable of allowing the release of the armature A2 under the action of the springs R2, while maintaining the armature A1 adhered to the housing C against the springs R1. The staggered release of the armatures A1 and A2 over time makes it possible to achieve effective braking with a stepped effect, thus avoiding abrupt stops. The control means E thus make it possible to switch the winding B among three states: a non-energized state, a stabilized maximum state in which the two armatures A1 and A2 are pressed against the housing and an intermediate state allowing the armature A2 to be free from the magnetic attraction of the winding B. The changeover from one state to another can be immediate, or gradual over time in order to achieve a damping effect.

We will now describe a complete cycle of operation of this braking device. When the winding is at rest, i.e. not supplied with current, the springs R1 and R2 are fully active and push the armatures A1 and A2, respectively, towards the friction discs D1 and D2. More specifically, the armature A2 is pushed against the disc D1, aided therein by the armature A1, which pushes the armature A2. The disc D1 is thus pushed against the intermediate flange F2, which is pushed against the disc D2, which presses against the end flange F1. It may be said that the two armatures A1, A2, the two discs D1, D2 and the flange F2 have been axially displaced leftward in FIG. 1 toward the flange F1, and away from the housing C. The discs D1 and D2 are thus locked in rotation and the shaft S can no longer turn. The braking device is then fully active, even though the supply of current has been cut off.

To unlock the braking device, the means of control E are used to change from the non-energized state to the maximum state without passing through the intermediate state. The winding B is then fully energized, attracting both armatures A1 and A2 simultaneously towards the housing C. The discs D1 and D2 are released and the shaft S can turn again. As a variant, the control means E can change immediately or gradually through the intermediate state so as to sequentially move the two armatures A1 and A2, and thus progressively release the discs D1 and D2. This makes it possible to obtain a softer startup without jerking. In either case, once the two armatures are pressed against the housing C, the control means E regulate the current and/or voltage supplied to the winding B, in order for the attraction power thereof to be stable.

During braking, the control means E are again called upon to change from the maximum supply state to the intermediate state, enabling the release of the armature A2 (only), while the armature A1 will remain pressed against the housing C until the control means E then switch to the non-energized state, in which the armature A1 will also be released. The intermediate state can last from 0.1 to 10 seconds. The gradual changeover from the maximum state to the intermediate state and from the intermediate state to the non-energized state can last from 0.1 to 1 second.

The control means alone can ensure a proper operation of the braking device by adjusting the level of intensity of the intermediate state, the duration of the intermediate state and the dynamics of the gradual changeovers. However, to achieve optimal operation and maximum efficiency, it is advantageous to choose the thicknesses of the magnetic armatures A1, A2 within the ranges of recommended values above, because these characteristics directly influence the dynamic behavior of the magnetic armatures A1, A2. The air gaps J1 and/or J2, as well as the elastic biasing with stop of the intermediate flange F2 also participate in optimizing the braking device in terms of pleasant sensations, since the air gaps J1 and/or J2 allow a jerk-free release of the armatures and intermediate flange F2 leaves the friction discs freely rotatable.

Figure 3:
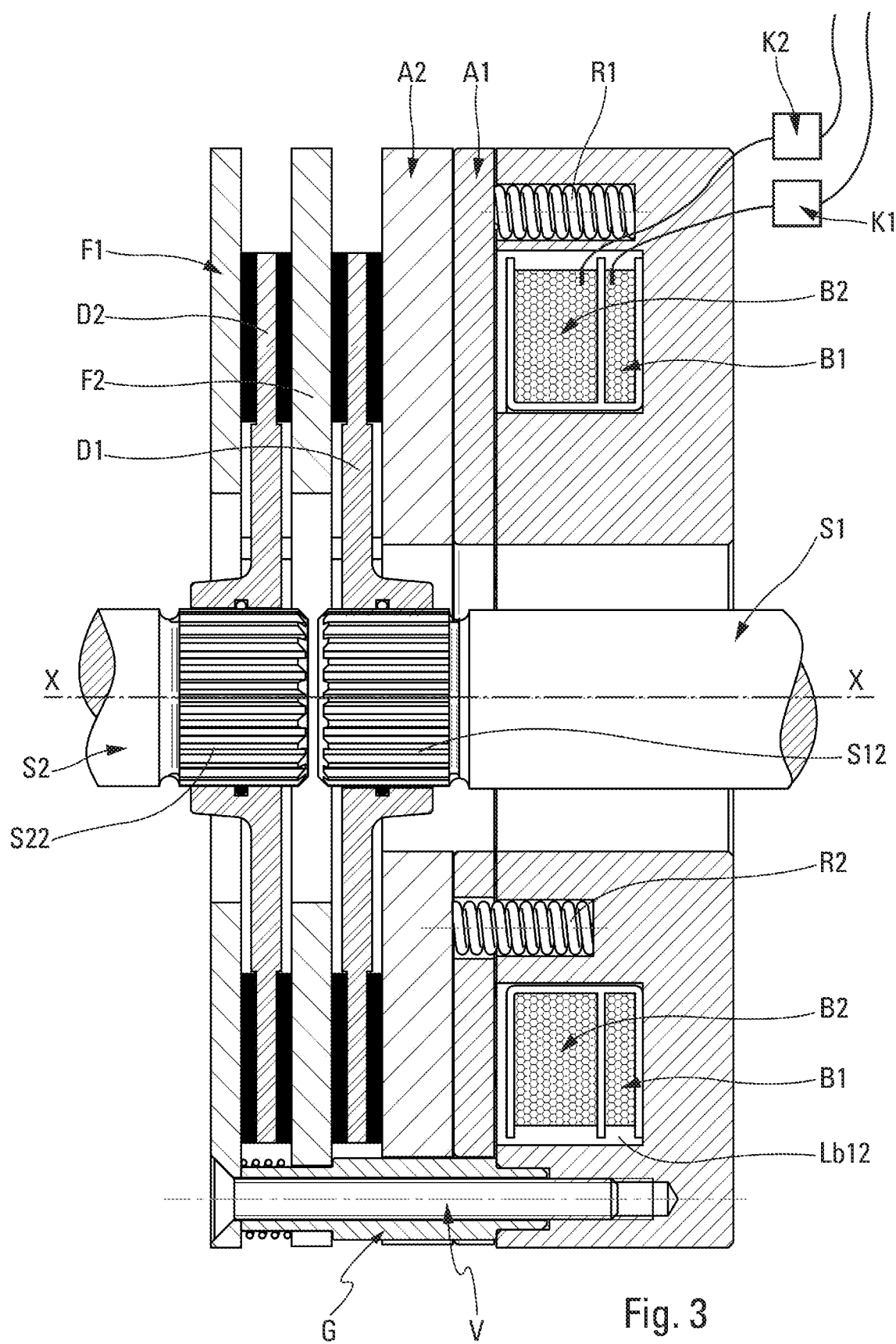
FIG. 3 represents a variant of the embodiment of FIG. 1 with two windings in series and two rotary shafts.

Reference will now be made to FIG. 3, which describes a second embodiment that differs from the first embodiment of FIGS. 1 and 2 by two characteristics, namely two independent rotary shafts, as well as the structure and control of the winding.

Instead of the single shaft S of the first embodiment, the embodiment of FIG. 3 has two shafts S1 and S2 that are independent of one another, such that they can turn with different speeds of rotation. The two shafts S1 and S2 are arranged to be perfectly aligned along a longitudinal axis X. They each comprise a splined shaft end S12, S22: said shaft ends face each other in FIG. 3 with a small separation. The shafts S1 and S2 can for example be driven in rotation by two respective motors, not shown, which turn the two front or rear wheels of a vehicle, such as a forklift for example.

Moreover, instead of the single winding B of the first embodiment, the embodiment of FIG. 3 provides two windings B1 and B2 which are mounted in series one behind the other along the axis X in a single receptacle Lb12. It should be noted that the arrangement in series results in little or no modification of the first embodiment, since the single receptacle Lb12 can be identical or similar to the receptacle Lb of the first embodiment. Thus, although there are two windings B1 and B2 in this variant, this does not influence the space requirement of the braking device, which still remains compact.

These two windings B1 and B2 are energized independently by current and voltage. Instead of the control means E that are complex and expensive because they are electronic, provision is simply made of electrical switching means, for example in the form of two commutators or switches K1 and K2, which make it possible to change from a zero supply state to a maximum supply state for each of the windings B1 and B2. It is therefore enough to properly sequence the consecutive actions of the two commutators K1 and K2 to reproduce the operation of the control means E.

During a braking operation, the commutator K2 is actuated first so as to cut off the electrical supply of the winding B2. This results in releasing the armature A2, since the winding B1 is not powerful enough to hold the armature A2, which will therefore be moved against the friction disc D1, which will be moved against the intermediate flange F2, which in turn is moved against the friction disc D2, which finally is moved against the end flange F1. Both discs D1 and D2 are braked during the rotation thereof, but completely locked. This sequence is the same as the one that occurs in the first embodiment when the control means E changes from the maximum state to the intermediate state. At the end of a period of time on the order of 0.1 to 10 seconds after the actuation of the commutator K2, the commutator K1 is actuated in turn to cut off the electrical supply of the winding B1. This results in releasing the armature A1, which will be pressed against the armature A2 and thus apply an additional thrust force that will cause the locking in rotation of both discs D1 and D2. A stepped or progressive braking is obtained with two windings in series controlled by simple switches.

According to the invention, it is advantageous for the winding B2 to be more powerful than the winding B1, in order to optimize the priority control of the armature A2 by the winding B2. Thus, the winding B2 can be considered as the strong winding and winding B1 can be considered as weak winding. In FIG. 3, the strong winding B2 is situated adjacent to the armature A1 and the weak winding B1 is separated from the armature A1 by the strong winding B2. This arrangement is not unique: the reversal of the windings is quite possible without modifying the behavior and action of the windings on the armatures A1 and A2. The power ratio (in ampere-turns) of the strong winding B2/weak winding B1 ranges from 1 to 4, advantageously from 1 to 3, more advantageously from 2 to 3 and preferably is equal to 2.2±0.2.

These winding power ratios (strong/weak), together with the thickness ratios for the armatures A1, A2 and the air gaps J1 and/or J2, combine to achieve a braking device producing a stepped or progressive braking that is particularly controlled. The elastic biasing with stop of the intermediate flange F2 also participates in optimizing the braking device, since it significantly reduces abnormal premature wear.

Figure 4:
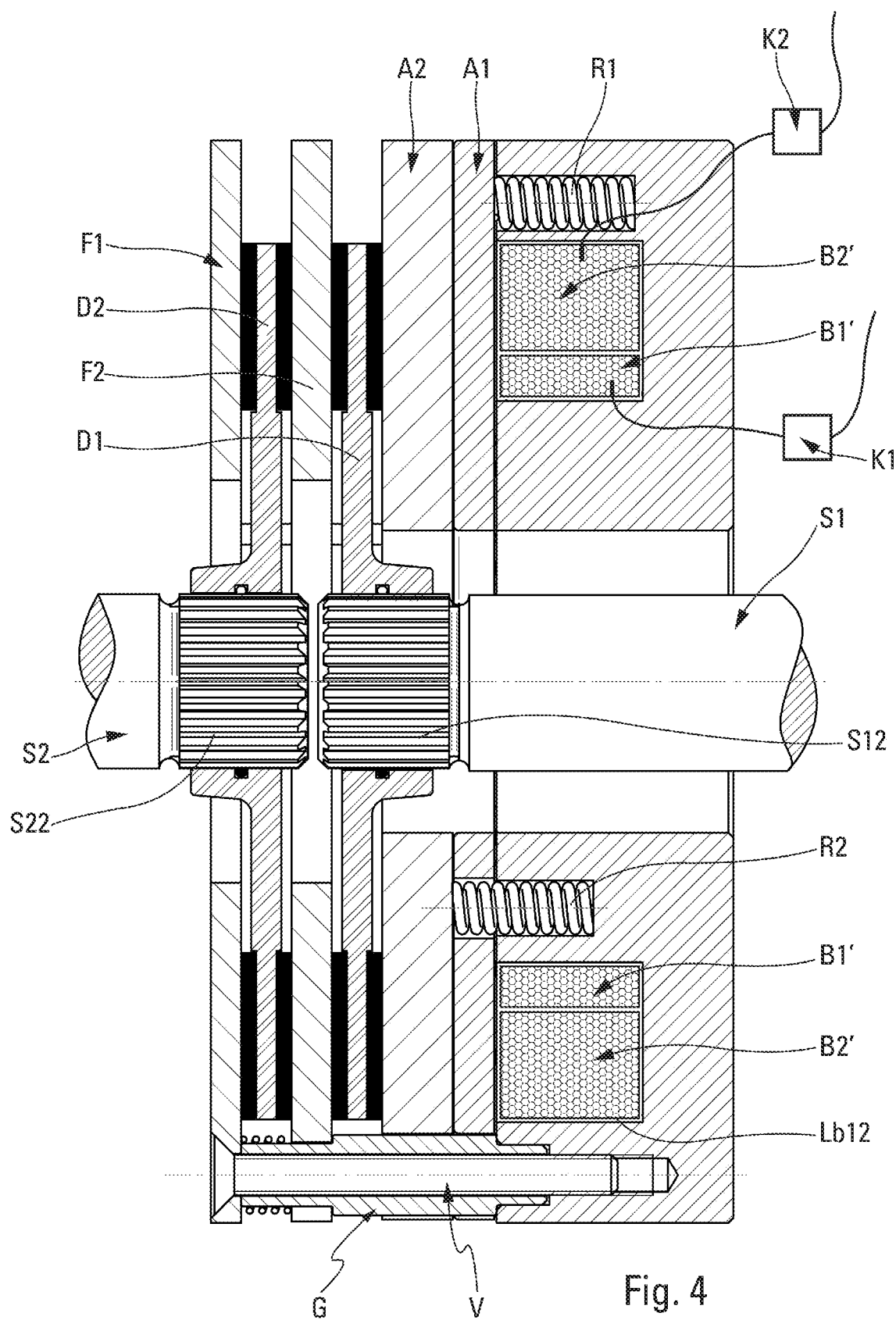
FIG. 4 represents a variant of the embodiment of FIG. 1 with two concentric windings and two rotary shafts.

The embodiment of FIG. 4 differs from that of FIG. 3 only in that the two windings in series B1 and B2 have been replaced by two windings in parallel B1' and B2', which are arranged concentrically. The winding Br is arranged inside the winding B2'. Advantageously, the winding B1' has a lower power than that of the winding B2'. Thus, the winding B1' can be considered as the weak winding and the winding B2' can be considered as strong winding. It should be noted that this concentric dual winding B1', B2' is received in a receptacle Lb12 that is identical to the one of the embodiment in FIG. 3, so that the total space requirement remains the same. It should also be noted that said concentric dual winding B1', B2' is implemented with the dual armature A1, A2, which is arranged in series.

Figure 5:
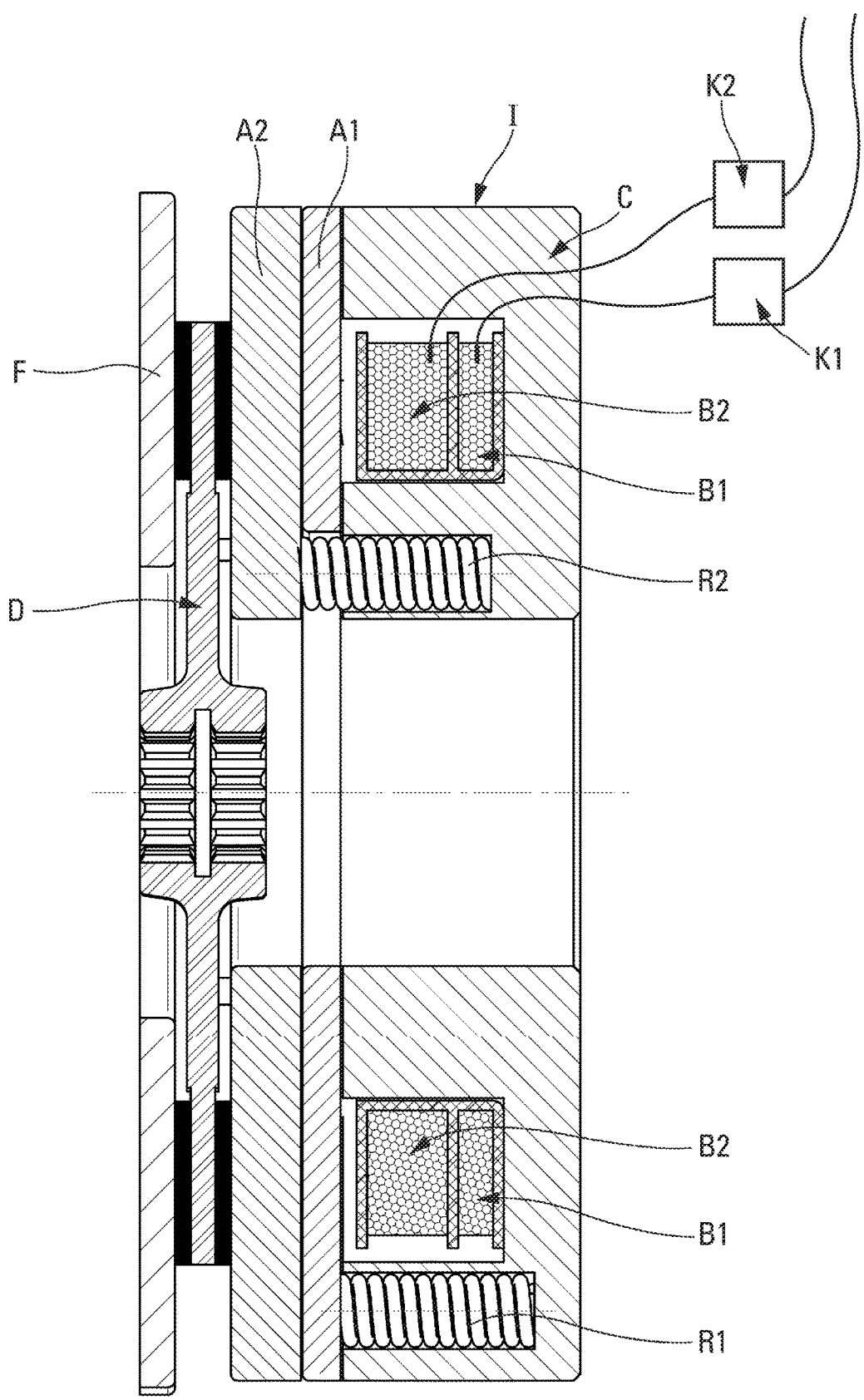
FIG. 5 represents an alternative embodiment utilizing only one friction disc, but two windings.

The embodiment of FIG. 5 differs from that of FIG. 3 in that there is only one friction disc D and no intermediate flange F2: there is only an end flange F. However, there are two windings B1 and B2, the characteristics of which can be identical or similar to those of the variant of FIG. 3. In a variant not shown, the two windings can also be mounted in parallel, i.e. concentrically. This is also true for the two commutators K1 and K2. The purpose of this embodiment is to show that a double magnetic armature A1, A2 arranged in series associated with a double winding B1, B2 (arranged in series or in parallel) can also be implemented on a single friction disc D sandwiched between the armature A2 and the end flange F, with the same advantages of progressivity or control in the braking. Obviously, this particular embodiment can be protected independent of the other two embodiments of FIGS. 1 to 4, which use two friction discs.

The invention claimed is:

1. A braking device of at least one rotary shaft (S; S1, S2) extending along a longitudinal axis X, the braking device comprising at least:
    an actuation unit (I) comprising at least one winding (B; B1, B2; B1', B2') and first and second series of springs (R1, R2) mounted in a fixed housing (C),
    two friction discs (D1, D2) mounted axially slidable on said at least one rotary shaft (S; S1, S2),
    a rotationally fixed end flange (F1),
    an intermediate flange (F2) that is rotationally fixed but mounted axially slidable between the two friction discs (D1, D2),
    two magnetic armatures (A1, A2) that are rotationally fixed, but mounted axially slidable and biased respectively, when idle, by the first and second series of springs (R1, R2), in such a way that one (A2) of the two magnetic armatures (A1, A2) is pushed against one (D1) of the two friction discs (D1, D2), which then engages the intermediate flange (F2), which in turn engages the other friction disc (D2), which engages the end flange (F1), and when the winding (B; B1, B2; B1', B2') is supplied with current, the magnetic armatures (A1, A2) are magnetically biased towards the winding (B; B1, B2; B1', B2'),
    characterized in that the magnetic armatures (A1, A2) are arranged in series along the longitudinal axis X, with each of the first and second series of springs (R1, R2) respectively biasing a magnetic armature (A1, A2), the second series of springs (R2) passing through the thickness of one of the two magnetic armatures (A1) in order to bias the other magnetic armature (A2),
    wherein the intermediate flange (F2) is elastically biased by a spring (R3) towards the friction disc (D1) adjacent to one of the two magnetic armatures (A2), to be separated when idle from the friction disc (D2) adjacent to the end flange (F1)
    wherein the intermediate flange (F2) engages a fixed stop (G13) under the action of the elastic biasing (R3), so as to be separated when idle from both friction discs (D1, D2) at the same time
    further comprising assembly screws (V) that connect the end flange (F1) to the actuation unit (I), at least some of said assembly screws (V) being provided with guide sleeves (G) that together form the fixed stop (G13) for the intermediate flange (F2), which is biased, advantageously by the spring (R3) mounted around a section (G12) of the guide sleeve (G) and which is supported on the end flange (F1).

2. The braking device according to claim 1 wherein the spring (R3) is disposed between the actuation unit (I) and the end flange (F1).

3. The braking device according to claim 1 wherein the spring (R3) is disposed between the end flange (F1) and the intermediate flange (F2).

4. The braking device according to claim 1 wherein each end of the spring (R3) is disposed about the section (G12) of the guide sleeve (G).

5. The braking device according to claim 1, wherein the intermediate flange (F2), and advantageously also the two magnetic armatures (A1, A2), are rotationally fixed by the guide sleeves (G) while sliding along the guide sleeves (G).

6. The braking device according to claim 1, wherein the actuation unit (I) comprises a single winding (B), the braking device comprising current/voltage control means (E) for the winding (B) capable of controlling the maximum and intermediate values of current/voltage.

7. The braking device according to claim 1, wherein the actuation unit (I) comprises two windings (B1, B2; B1', B2') advantageously arranged in a single annular receptacle (Lb12) formed by the housing (C) of the actuation unit (I), the braking device comprising electric switching means (K1, K2) for the two windings (B1, B2; B1', B2') capable of delivering to each of the two windings (B1, B2; B1', B2') only a zero voltage or a maximum voltage.

8. The braking device according to claim 7, wherein the two windings (B1, B2; B1', B2') have different powers, thus defining a strong winding (B2, B2') and a weak winding (B1, B1').

9. The braking device according to claim 8, wherein the power ratio in ampere-turns of the strong winding (B2; B2')/weak winding (B1; B1') ranges from 1 to 4.

10. The braking device according to claim 7, wherein the two windings (B1, B2) are arranged in series along the longitudinal axis X.

11. The braking device according to claim 1, wherein a non-magnetic intermediate air gap (J2) separates the two magnetic armatures (A1, A2).

12. The braking device according to claim 1, wherein a non-magnetic intermediate air gap (J1) separates one (A1) of the two magnetic armatures (A1, A2) and the actuation unit (I).

13. The braking device according to claim 1, wherein the magnetic armatures (A1, A2) have different axial thicknesses, the magnetic armature (A2) adjacent to one of the friction discs (D1) advantageously having a greater thickness than the one adjacent to the actuation unit (I), advantageously with a ratio ranging from 1.2 to 3.

14. The braking device according to claim 1, wherein the two magnetic armatures (A1, A2), the intermediate flange (F2) and the end flange (F1) are in the form of flat plates having constant thicknesses, central passages (A10, A20, F10, F20) and cylindrical edges (A12, A25, F15, F25) with notches (A11, A21, F11, F21).

15. The braking device according to claim 1, wherein the friction discs (D1, D2) are mounted respectively on two independent rotary shafts (S1, S2).

16. The braking device according to claim 7, wherein the two windings (B1', B2') are arranged concentrically in parallel.

* * * * *